United States Patent
Seki et al.

[11] Patent Number: 6,131,063
[45] Date of Patent: Oct. 10, 2000

[54] BRAKE DEVICE FOR VEHICLE

[75] Inventors: Makito Seki; Mitsuo Shimotani; Minoru Nishida, all of Tokyo, Japan

[73] Assignee: Mitsubushi Denki Kabushiki Kaisha, Tokyo, Japan

[21] Appl. No.: 09/110,403

[22] Filed: Jul. 6, 1998

[30] Foreign Application Priority Data

Aug. 6, 1997 [JP] Japan .................................. 9-211956

[51] Int. Cl.[7] ...................................................... B60T 8/58
[52] U.S. Cl. .............................. 701/70; 701/96; 701/301; 340/575
[58] Field of Search .................................. 701/70, 93, 96, 701/300, 301; 342/455; 340/435, 436, 437, 438, 575, 903; 180/167, 168, 169

[56] References Cited

U.S. PATENT DOCUMENTS

| | | | |
|---|---|---|---|
| 4,502,122 | 2/1985 | Yanagishima et al. | 340/575 |
| 5,014,200 | 5/1991 | Chundrlik et al. | 701/96 |
| 5,230,400 | 7/1993 | Kakinami et al. | 701/301 |
| 5,234,071 | 8/1993 | Kajiwara | 701/301 |
| 5,357,438 | 10/1994 | Davidian | 701/96 |
| 5,375,060 | 12/1994 | Nöcker | 701/96 |
| 5,574,641 | 11/1996 | Kawakami et al. | 340/575 |
| 5,745,031 | 4/1998 | Yamamoto | 340/575 |
| 5,821,860 | 10/1998 | Yokoyama et al. | 340/575 |
| 5,850,176 | 12/1998 | Kinoshita et al. | 701/96 |

*Primary Examiner*—Gary Chin
*Attorney, Agent, or Firm*—Sughrue, Mion, Zinn, Macpeak & Seas, PLLC

[57] ABSTRACT

A vehicle brake device includes: a braking-operation detecting circuit for detecting an amount of the braking operation given by a driver; a driver condition detecting circuit 4 for detecting driving conditions of the driver; a braking-condition determining circuit for determining whether the vehicle is in emergency or not on the basis of the driving conditions detected by the driver condition detecting circuit; and a braking-force control circuit for control a braking force of the vehicle in accordance with the determination by the braking-condition determining circuit and the braking-operation amount detected by the braking-operation detecting circuit 2.

10 Claims, 7 Drawing Sheets

BRAKE DEVICE FOR VEHICLE

BACKGROUND OF THE INVENTION

The present invention relates to a vehicle brake device, and more particularly to the technique for a brake assist control and an automatic brake control in case of emergency of the vehicle.

When perceiving a danger of a vehicle collision, a driver of a vehicle depresses in haste the brake pedal to decelerate the vehicle. In this case, a maximum braking force is required as a matter of course. Actually, the driver frequently fails to sufficiently depress the brake pedal, however. The result is an insufficient deceleration of the vehicle. To cope with this, there is proposed a vehicle brake device incorporating a brake assist control function thereinto (Japanese Patent Publication Nos. Hei-7-329766 and 8-295224). In the event of emergency, the brake assist control functions to adjust a hydraulic braking pressure so as to maximize a braking force, while compensating for an insufficient braking force applied by the driver.

Figure 13:
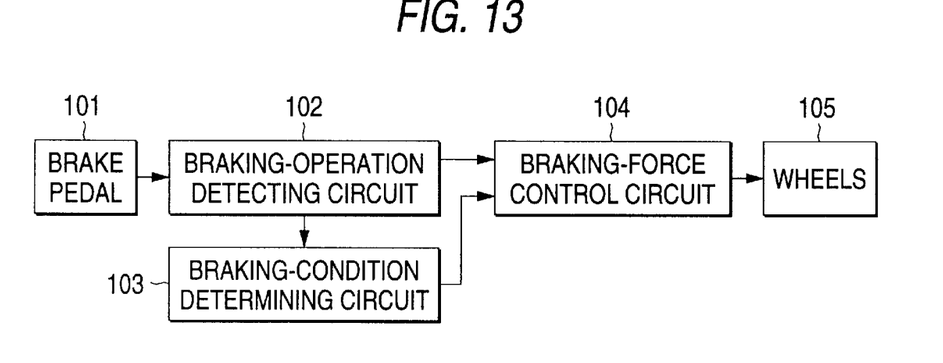
FIG. 13 is a block diagram showing an arrangement of a conventional vehicle brake device.

A conventional vehicle brake device, which is disclosed in Japanese Patent publications referred to above, is shown in FIG. 13.

In the figure, reference numeral 101 is a brake pedal of a vehicle; 102 is a braking-operation detecting circuit for detecting a braking operation made by a driver; 103 is a braking-condition determining circuit for determining as to whether the braking operation is a normal braking operation or an emergency braking operation on the basis of the braking operation detected by the braking-operation detecting circuit 102; and 104 is a braking-force control circuit for controlling a braking force depending on the determination made by the braking-condition determining circuit 103 and applying the so controlled braking force to the vehicle wheels 105.

Figure 14:
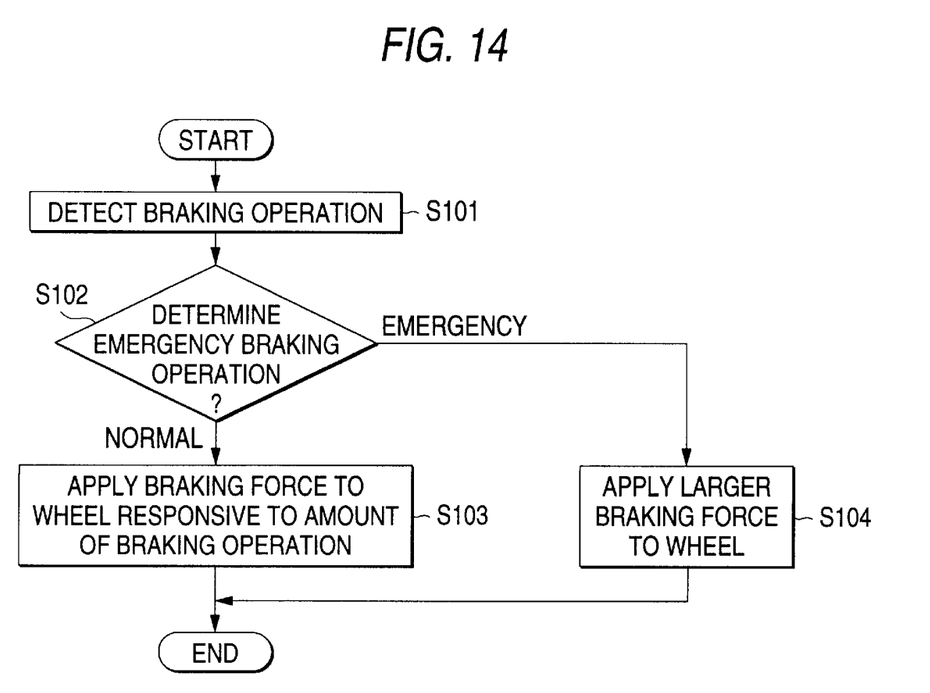
FIG. 14 is a flow chart showing the operation of the FIG. 13 device.

The operation of the FIG. 13 vehicle brake device is flow charted in FIG. 14.

The vehicle brake device detects a braking operation given when a driver depresses the brake pedal (S101). The vehicle brake device determines whether the braking operation detected is a normal braking operation or an emergency braking operation (S102). A methodological example of the braking-operation determining gains a maximum amount of the braking operation by the driver; it checks if the maximum amount of the braking operation exceeds a predetermined one; if the answer is yes, it determines that the current braking operation is an emergency braking operation. Another example measures a time elapsing from the start of the braking operation till the braking operation reaches its maximum amount; when the elapsing time is within a predetermined predetermined one, it determines that the braking operation is an emergency braking operation.

If the current braking operation is a normal braking operation (S102), the vehicle brake device applies a normal braking force, which is based on the amount of the braking operation by the driver, to the wheels (S103). If it is an emergency braking operation, the vehicle brake device applies a braking force, which is larger than the normal braking force, to the wheels (S104).

As described above, the conventional vehicle brake device judges if the braking operation by the driver is a normal braking operation or an emergency braking operation, on the basis of the amount of the braking operation or the braking operation speed. Therefore, the brake assist control (operates in emergency) in the brake control by the vehicle brake device does not function till the amount of the braking operation by the driver exceeds a predetermined one.

For this reason, in emergency the brake assist control does not function or much time is taken from the start of the braking operation by the driver till the brake assist control starts to operate, for the braking operations by some types of drivers, e.g., woman drivers, who tend to depress the brake pedal not strongly, generally.

For those drivers having the habit of strongly depressing the brake pedal, the brake assist control operates not in emergency, giving the drivers an unnatural drive feeling.

SUMMARY OF THE INVENTION

The present invention has been made to solve the problems as mentioned above, and has an object to provide a vehicle brake device which can determine an emergency level quickly, exactly and independently of driving way differences among the drivers, and provides a maximum braking force in emergence even if the amount of braking operation is insufficient and hence a reduction of a braking distance of the vehicle.

To achieve the above object, there is provided a vehicle brake device comprising: braking-operation detecting means for detecting an amount of the braking operation given by a driver; driver's condition detecting means for detecting driving conditions of the driver; emergency judging means for judging whether the vehicle is in emergency or not on the basis of the driver's conditions detected by the driver's condition detecting means; and braking-force control means for control a braking force of the vehicle in accordance with the result of the judgement by the emergency judging means and the braking-operation amount detected by the braking-operation detecting means.

The vehicle brake device further comprises surrounding-condition detecting means for detecting the surrounding conditions of the vehicle. In the device, the surrounding conditions detected by the surrounding-condition detecting means is also taken into consideration in the emergency judgement by the emergency judging means.

The emergency judging means determines an urgency level on the basis of the driver's conditions, and the braking-force control means controls a braking force of the vehicle in accordance with the urgency level determined.

The emergency judging means determines an urgency level on the basis of a time that elapses from an instant that a driving condition is changed from an inattentive driving condition to a normal driving condition.

The emergency judging means determines an urgency level on the basis of a continuance in time of an inattentive driving condition of the driver.

In the vehicle brake device, the emergency judging means judges that an urgency level is high, when the driver actuates the brakes immediately after a driving condition is changed from an inattentive driving condition to a normal driving condition.

The inattentive driving condition is a sleepy or looking-aside driving condition.

The braking-force control means increases more a braking force of the vehicle as an urgency level becomes higher.

According to another aspect, there is provided a vehicle brake device comprising: surrounding-condition detecting means for detecting surrounding conditions of the vehicle; danger determining means for determining a dangerous level of possible vehicle collision on the basis of the surrounding conditions detected by the surrounding-condition detecting means; and braking force control means for continuing an automatic brake control mode till the driver starts to actuate the brakes.

The vehicle brake device further comprises alarming means for warning of possible vehicle collision against the driver in accordance with on a dangerous level, the braking force control means for continuing an automatic brake control mode from an instant that the alarming means starts to warn of possible vehicle collision till the driver starts to actuate the brakes.

The vehicle brake device further comprises braking-operation detecting means for detecting an amount of the braking operation by the driver, and in the device, when a dangerous level indicates a danger of vehicle collision, the braking force control means performs an automatic brake control mode till the driver actuates the brakes, and when the driver actuates the brakes, the braking force control means controls the braking force in accordance with the dangerous level and the amount of braking operation.

When the braking force control means changes its braking force control mode from the automatic brake control mode to the control mode in which the braking force control means controls the braking force in accordance with the dangerous level and the amount of braking operation, the braking force control means controls the braking force so as to be continuous in variation at the mode shifting point.

DETAILED DESCRIPTION OF THE PREFERRED EMBODIMENTS

First Embodiment

Figure 1:
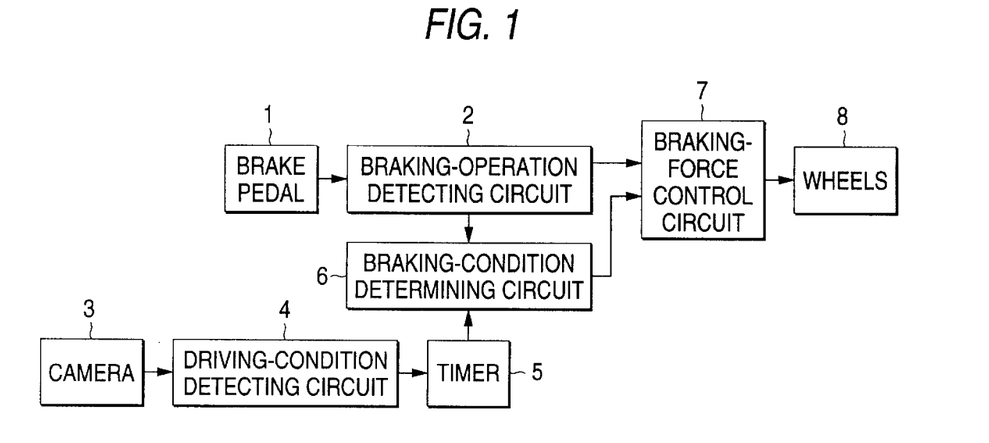
FIG. 1 is a block diagram showing an arrangement of a vehicle brake device, which is a first embodiment of the present invention.

FIG. 1 is a block diagram showing an arrangement of a vehicle brake device, which is a first embodiment of the present invention. In the figure, reference numeral 1 is a brake pedal of a vehicle; 2 is a braking-operation detecting circuit for detecting a braking operation made by a driver and an amount of the braking operation; 3 is a camera for photographing the face of a driver; 4 is a driver's condition detecting circuit for detecting driving conditions of the driver, e.g., sleepy or looking-aside driving, from an image processed and produced by the camera 3; 5 is a timer; 6 is a braking-condition determining circuit 6 for determining an urgency level of the braking operation by the driver on the basis of an elapsing time of the timer 5; and 7 is a braking-force control circuit for controlling a braking force in accordance with an urgency level of the braking operation determined by the braking-condition determining circuit 6 and an amount of braking operation detected by the braking-operation detecting circuit 2, and applying the controlled one to wheels 8.

Operations of the thus arranged vehicle brake device of the first embodiment will be described while referring to flow charts of FIGS. 2 and 3.

Figure 2:
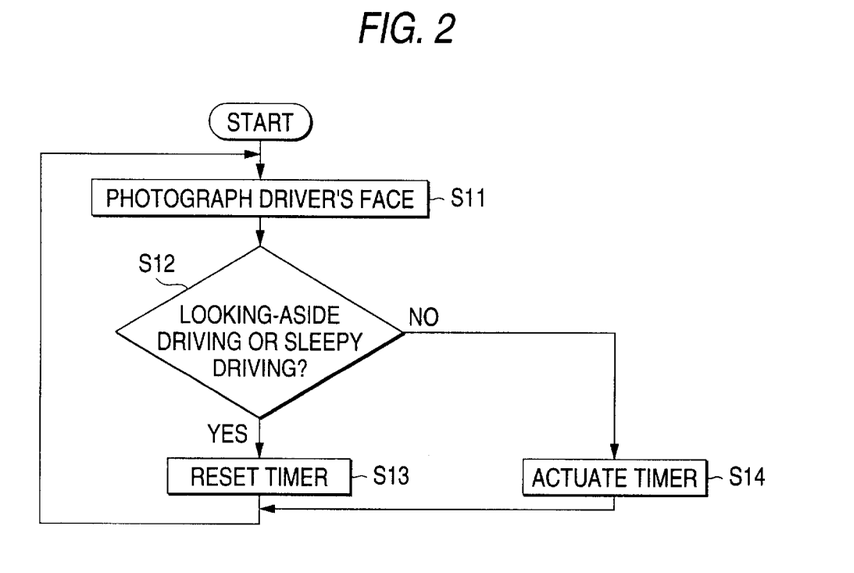
FIG. 2 is a flow chart showing the operations of a part of the vehicle brake device of FIG. 1.

FIG. 2 is a flow chart showing the operations of a circuitry including the camera 3, driver's condition detecting circuit 4, and timer 5. A sequence of operations steps S11 to S14 is repeated at fixed periods independently of the operations of other circuits. The camera 3 of the vehicle brake device photographs the face of a driver (step S11). Then, the driver's condition detecting circuit 4 processes an image of the driver's face output from the camera 3 and detects driving conditions, e.g., looking-aside driving and sleepy driving, and sequentially stores the results of the detect (step S12).

A methodological example of the detecting of the looking-aside driving through the image processing uses the direction of the driver's face and the advancing direction of the vehicle for the detecting (Japanese Patent Publication No. Hei-6-270712). An example of the detecting method of the sleepy driving uses the eyelid blinking patterns for the detecting (Japanese Patent Publication No. Hei-6-219181).

If the driving condition by the driver is inattentive, i.e., sleepy or looking aside (step S12), the timer 5 is reset (step S13). If the driving condition is normal, the timer 5 continues its time counting operation (S14). The timer, when thus operated, can measure a time elapsing from a driver's condition changing point from an inattentive driving condition to a normal driving condition (e.g., a looking-aside driving condition to a looking-to-front driving condition, and a sleepy driving condition to a after-roused or normal driving condition).

The sequence of the steps S11 to S14 is repeated.

The operation of a circuitry including the braking-operation detecting circuit 2, braking-condition determining circuit 6 and braking-force control circuit 7 will be described with reference to a flow chart of FIG. 3.

The braking-operation detecting circuit 2 detects a braking operation by the driver and an amount of the braking operation (step S15), and the braking-condition determining circuit 6 determines an urgency level of the detected braking operation depending on a time (elapsing time) counted by the timer 5 at that time point (step S16).

Figure 4:
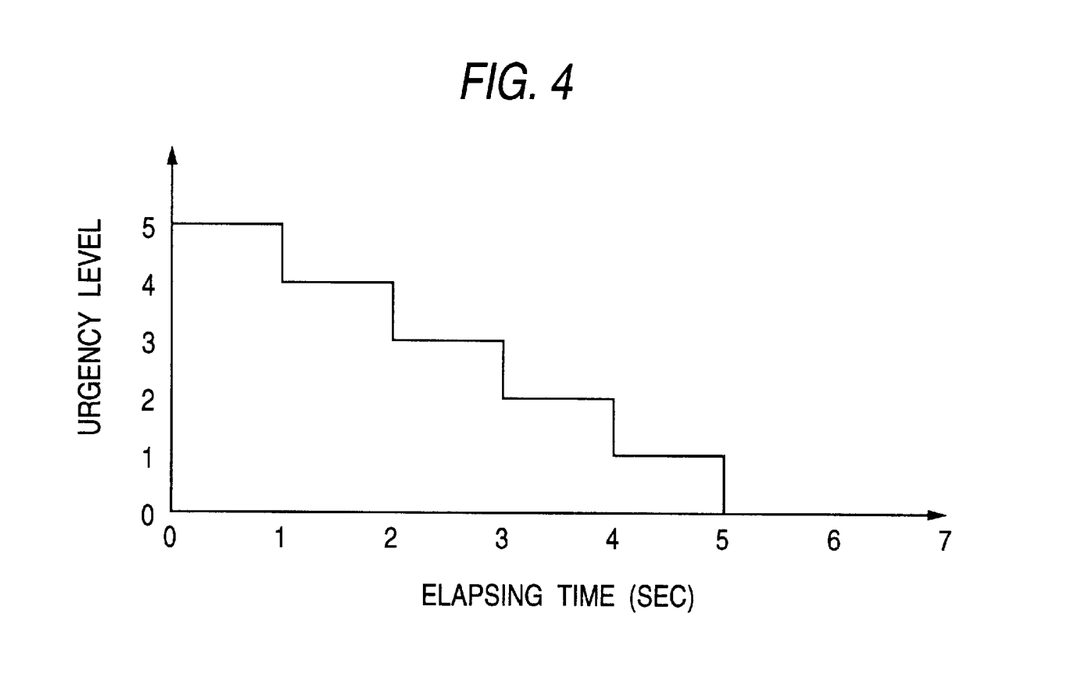
FIG. 4 is a graph showing a relationship of an urgency level of the braking operation to the elapsing time counted by the timer.

A relationship of an urgency level of the braking operation to the elapsing time is shown in FIG. 4. As shown, the urgency of the braking operation is ranked in five levels, 0 to 5. Specifically, the urgency levels are assigned to the elapsing time in the following manner. The elapsing time is segmented in length into 0 to 1, 2, 3, 4, and 5 seconds or longer; and the highest urgency level 5 is assigned to the time length of 0 to 1 second; levels 4 to 1 are respectively assigned to the time lengths 1 to 4; and the lowest urgency level 0, to the time length of 5 seconds and longer. Level 0 indicates that the braking operation is normal.

The braking-force control circuit 7 controls a braking force to be applied to the wheels or wheel brakes in accordance with the amount of braking operation (detected in step S15) and an urgency level of the braking operation (determined in step S16), and applies the thus controlled braking force to the wheels 8.

Figure 5:
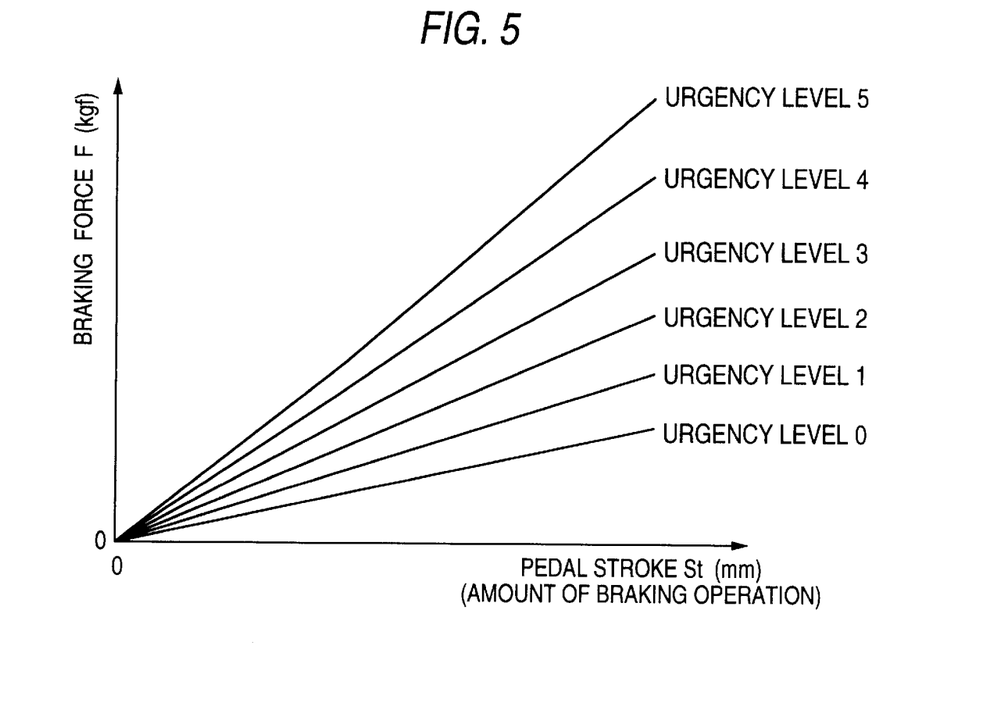
FIG. 5 is a graph showing relationships among braking force, pedal stroke length, and urgency levels, with the urgency levels being parameters.

Relationships among braking force F (kgf), pedal stroke length St (mm) (amount of braking operation), and urgency levels 0 to 5 are graphically depicted as shown in FIG. 5, with the urgency levels being parameters.

Figure 6:
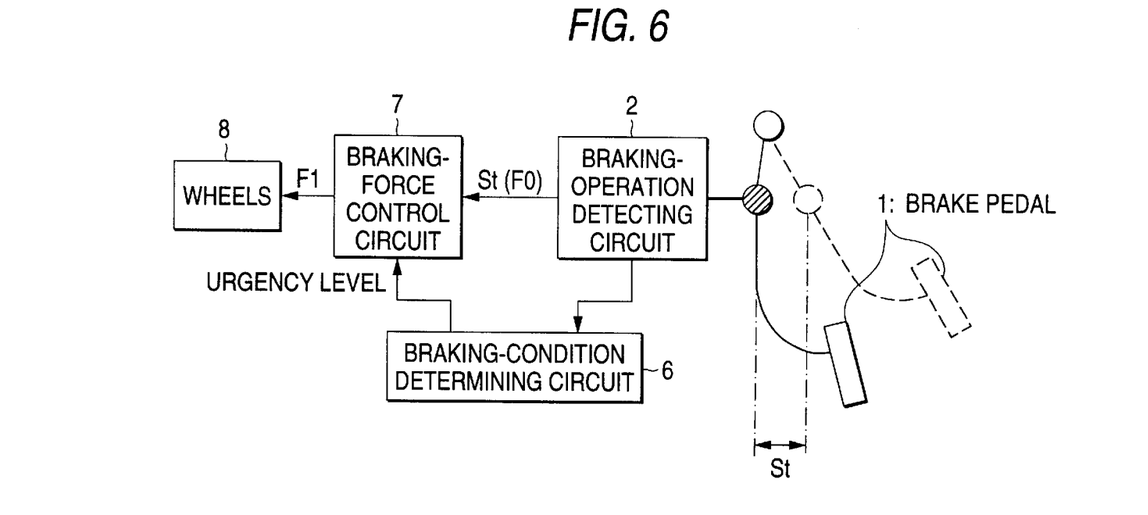
FIG. 6 shows a diagrammatic illustration about the brake pedal stroke.

A simple diagrammatic illustration about the brake pedal stroke is given in FIG. 6. As shown, a pedal stroke St corresponds to an amount of movement of the brake pedal 1, and is detected by the braking-operation detecting circuit 2.

The braking-force control circuit 7 determines a braking force F1 depending on a pedal stroke St (or a braking force F0, proportional to the pedal stroke St) and an urgency level determined by the braking-condition determining circuit 6 (FIG. 5), and applies the determined braking force F1 to the wheels 8. In the graph FIG. 5, as the urgency level becomes higher, a rate of increasing the braking force with respect to the pedal stroke St becomes larger.

In the first embodiment mentioned above, the urgency is ranked in six levels, level 0 to level 5; however, the number of urgency levels may be properly selected, e.g., smaller or larger than 6 levels.

Further, in the first embodiment, the urgency is degraded one level for each second. If necessary, it may be degraded every 0.5 second or any other time interval or it may be degraded two levels for each time interval.

Further, the urgency levels that are arrayed on a time axis have equal time durations. The time duration may be varied depending on the urgency level.

While the urgency level is discretely and stepwise varied with respect to the elapsing time in the first embodiment, it may be continuously varied with respect to the elapsing time.

The urgency level is determined by use of a time elapsing from a driver's condition changing point where an inattentive driving condition is changed to a normal driving condition (for example, a looking-aside driving condition is changed to a looking-to-front driving condition, and a sleepy driving condition is changed to a waking driving condition). Alternatively, a time duration of an inattentive driving condition (e.g., looking-aside or sleepy driving conditions) or a degree of an inattentiveness of the driver may be used for determining the urgency level. Another alternative is the combination of the determining method of the first embodiment and the conventional determining method based on the braking operation condition.

In the first embodiment, an image processing method is used for detecting an inattentive driving of the driver; if required, a photo sensor may be used for the same purpose (as disclosed in Japanese Patent Publication No. Hei-4-287724).

As described above, the vehicle brake device of the first embodiment determines an urgency level on the basis of driving conditions of the driver; it determines a braking force on the basis of the urgency level and the amount of the braking operation by the driver; and it applies the determined braking force to the wheel brakes. Therefore, the vehicle brake device can determine as to whether the vehicle is in emergence or not immediately after the brake pedal is operated, even if the amount of the braking operation is below a predetermined amount. Therefore, the vehicle brake device quickly starts its brake assist control function and hence reduces a braking distance of the vehicle correspondingly.

Unlike the conventional vehicle brake device in which the determining of an urgency level depends on only the amount of braking operation and the braking operation speed, the vehicle brake device of the first embodiment determines an urgency level independently of the driving way differences amount individual drivers, and the driver can operate the wheel brakes without unnatural drive feeling and exactly. More exactly, the vehicle brake device can uniformly determine an urgency level of the braking operation for any type of drivers. In this connection, woman drivers usually tend to depress the brake pedal not strongly, and some drivers have the habit of strongly depressing the brake pedal.

Further, the vehicle brake device of the first embodiment controls a braking force to be applied to the wheel brakes in accordance with an urgency level. This technical feature produces the following advantages: the full utilization of the braking capability of the vehicle brake device, a smooth brake control, and a safe stop of the vehicle.

Second Embodiment

Figure 7:
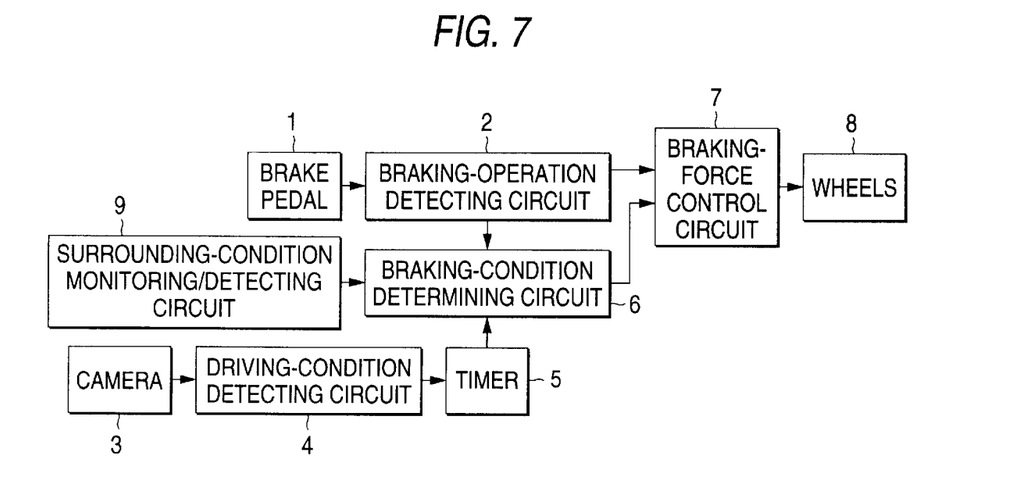
FIG. 7 is a block diagram showing an arrangement of a vehicle brake device, which is a second embodiment of the present invention.

FIG. 7 is a block diagram showing an arrangement of a vehicle brake device, which is a second embodiment of the present invention. The vehicle brake device of the second embodiment is arranged such that a surrounding-condition monitoring/detecting circuit 9 for detecting surrounding conditions of the vehicle is additionally incorporated into the vehicle brake device of the first embodiment.

The operations of the vehicle brake device of the second embodiment will be described. A circuitry including the driver's condition detecting circuit 4 and the timer 5 operates as flow charted in FIG. 2 already referred to in the description of the first embodiment. Thence, no further description of the circuitry will be given.

The surrounding-condition monitoring/detecting circuit 9 monitors surrounding conditions of the vehicle at fixed periods independently of the operations of the remaining circuits, and detects the surrounding conditions. More specifically, the surrounding-condition monitoring/detecting circuit 9 monitors the surroundings of the vehicle by use of a laser radar; it detects the directions of obstacles on all sides of the vehicle, the distances of the obstacles from the vehicle, and others; and it sequentially stores the detected ones into a related storage means.

Figure 3:
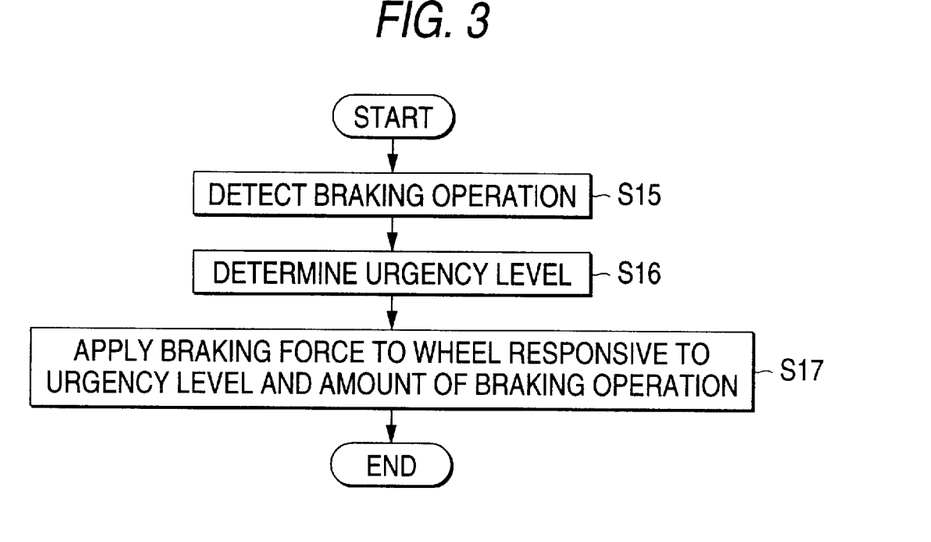
FIG. 3 is a flow chart showing the operations of another part of the vehicle brake device of FIG. 1.

The operations of a circuitry including the braking-operation detecting circuit 2, braking-condition determining circuit 6, and braking-force control circuit 7 are substantially the same as those in the corresponding circuitry in the first embodiment, except the method for determining an urgency level of the braking operation (step S16, FIG. 3). As recalled, the first embodiment determines an urgency level of the braking operation on the basis of an elapsing time that has been counted up to that time by the timer. In the second embodiment, the elapsing time and surrounding conditions as well are taken into consideration in determining an urgency level of the braking operation.

Figure 8:
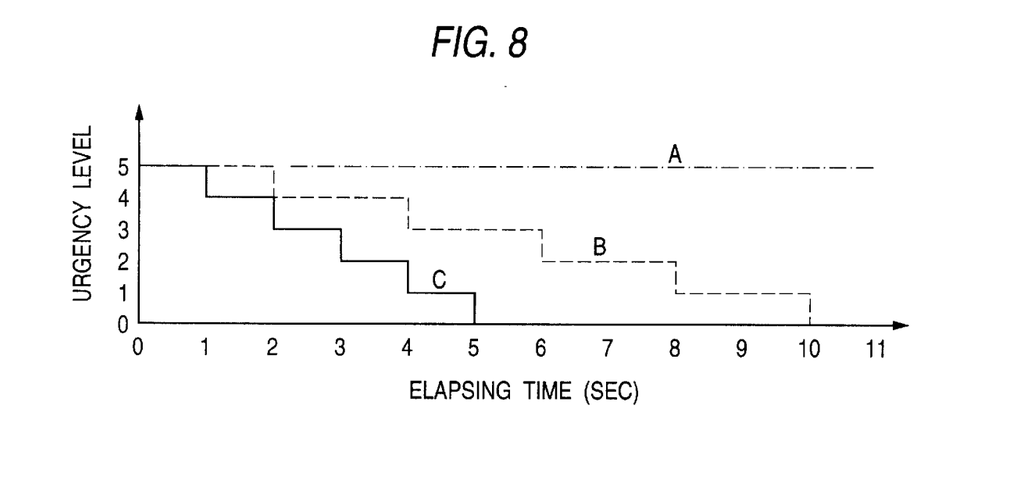
FIG. 8 is a graph showing a relationship of an urgency level of the braking operation to the elapsing time counted by the timer in the second embodiment.

A relationship of an urgency level of the braking operation to the elapsing time in the second embodiment is shown in FIG. 8. When the monitoring/detecting result derived from the surrounding-condition monitoring/detecting circuit 9 shows that a distance from the vehicle to an obstacle which may collide with the vehicle is shorter than a preset distance, an urgency level is kept at level 5 with respect to the elapsing time, as indicated by a rectilinear, one-dot chain line A in FIG. 8.

When the distance from the vehicle to the obstacle is longer than a first preset distance but is shorter than a second preset distance, the urgency level is varied as indicated by a dotted line B. As shown, the urgency level is kept at level 5 for the elapsing time from 0 to 2 seconds; it is degraded from level 5 to level 1 one by one every two seconds for the elapsing time from 2 to 10 seconds; and the urgency level is kept at level 0 for the elapsing time from 10 seconds or longer. The preset distance may be variably set depending on a relative speed of the vehicle to the obstacle into consideration.

The urgency level may be set at a desired number, while it is set at six levels, level 5 to level 0, in the second embodiment.

The relationship between the urgency level and the elapsing time is not limited to that in FIG. 8, but may be any other suitable relationship, if required.

The vehicle brake device of the second embodiment determines an urgency level of the braking operation depending on the surrounding conditions and the elapsing time counted by the timer. The combination of the surrounding conditions and a continuation or a degree of inattentive driving (sleepy, looking-aside driving, or the like) of the driver may be used for determining the urgency level, as an alternative. Further, the braking operation condition (used in the conventional vehicle brake device) may also be taken into consideration in determining the urgency level.

Thus, the vehicle brake device of the second embodiment determines an urgency level of the braking operation on the basis of attentive driving conditions and the surrounding conditions. Therefore, the vehicle brake device can determine as to whether the vehicle is in emergence or not immediately after the brake pedal is operated, even if the amount of the braking operation is below a predetermined amount. Therefore, the vehicle brake device quickly starts its brake assist control function and hence reduces a braking distance of the vehicle correspondingly.

Additionally, it is noted that the vehicle brake device of the second embodiment uses the additional conditions, i.e., the surrounding conditions, for the determining of an urgency level of the braking operation. Therefore, the vehicle brake device can determine an urgency level on the basis of not only the driving conditions of the driver but also an actual dangerous level of the surroundings. As a result, the vehicle brake device determines an urgency level independently of the driving way differences amount individual drivers, and the driver can operate the wheel brakes without unnatural drive feeling and exactly.

Further, the vehicle brake device controls a braking force to be applied to the wheel brakes in accordance with an urgency level, as in the first embodiment. This technical feature produces the following advantages: the full utilization of the braking capability of the vehicle brake device, a smooth brake control, and a safe stop of the vehicle.

Third Embodiment

Figure 9:
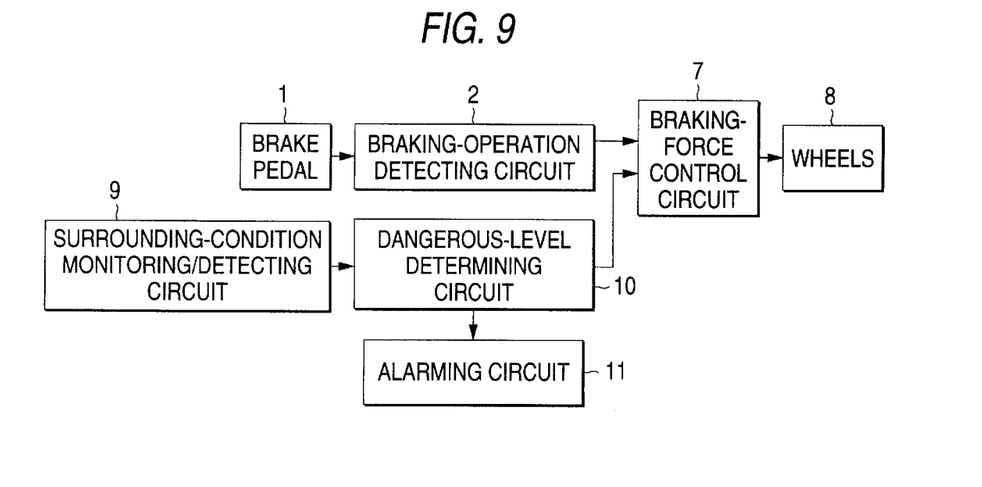
FIG. 9 is a block diagram showing an arrangement of a vehicle brake device, which is a third embodiment of the present invention.

FIG. 9 is a block diagram showing an arrangement of a vehicle brake device, which is a third embodiment of the present invention. In the figure, reference numeral 1 is a brake pedal of a vehicle; 2 is a braking-operation detecting circuit for detecting a braking operation made by a driver and an amount of the braking operation; 7 is a braking-force control circuit for controlling a braking force in accordance with a dangerous level determined by a dangerous-level determining circuit 10 and an amount of braking operation detected by the braking-operation detecting circuit 2, and applying the controlled one to wheels 8; 9 is a surrounding-condition monitoring/detecting circuit 9 for detecting surrounding conditions of the vehicle; 10 is the dangerous-level determining circuit 10 for determining a dangerous level (a level of possible collision occurrence) depending on the surrounding conditions detected by the surrounding-condition monitoring/detecting circuit 9; and 11 is an alarming circuit 11 for warning of vehicle collision in accordance of a dangerous level determined by the dangerous-level determining circuit 10.

Figure 10:
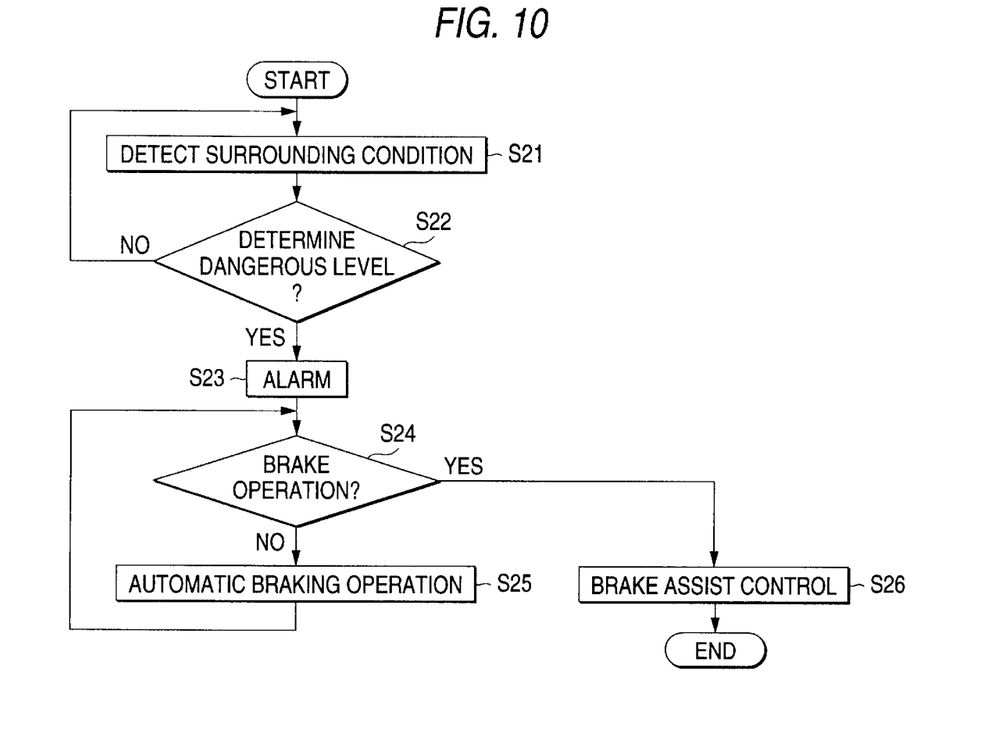
FIG. 10 is a flow chart showing the operations of the thus arranged vehicle brake device of the third embodiment.

FIG. 10 is a flow chart showing the operations of the thus arranged vehicle brake device of the third embodiment.

The operations of the vehicle brake device will be described with reference to FIG. 10.

The surrounding-condition monitoring/detecting circuit 9 monitors surrounding conditions of the vehicle (step S21). More specifically, the circuit 9 monitors the surroundings of the vehicle by use of a laser radar and detects the directions of obstructs on all sides of the vehicle, the distances of the obstacles from the vehicle, and others. Then, the dangerous-level determining circuit 10 determines a dangerous level depending on the surrounding conditions detected by the surrounding-condition monitoring/detecting circuit 9 (step S22). The dangerous level may be determined depending on a tolerable relative speed of the vehicle to the obstacle into consideration (as disclosed in Japanese Patent Laid-Open Publication No. Hei-3-260900). Also in the third embodiment, the dangerous level is ranked in six (6) levels as the urgency level in the first embodiment, for ease of explanation. The number of dangerous levels may be selected properly.

If the dangerous level is high (e.g., level 1 or higher) or indicates the vehicle being in danger, viz., a vehicle collision is impending (step S22), the dangerous-level determining circuit 10 issues an alarm signal to warn of collision against the driver (step S23). A measure to vary the volume or tone of alarm sounding in accordance with a dangerous level would provide an effective alarming against the driver.

After the start of alarming, check is made as to whether or not the driver operates the wheel brakes (step S24). The braking-force control circuit 7 performs an automatic braking operation that depends on a dangerous level (step S25) till the check result shows that the driver operated the brakes, viz., the answer is YES (step S24).

When the answer is YES (step S24), the braking-force control circuit 7 stops its automatic braking operation (step S25), and executes its brake assist control function (step S26). In the brake assist control, the braking-force control circuit 7 applies a braking force that depends on a dangerous level and an amount of braking operation to the wheels 8.

Figure 11:
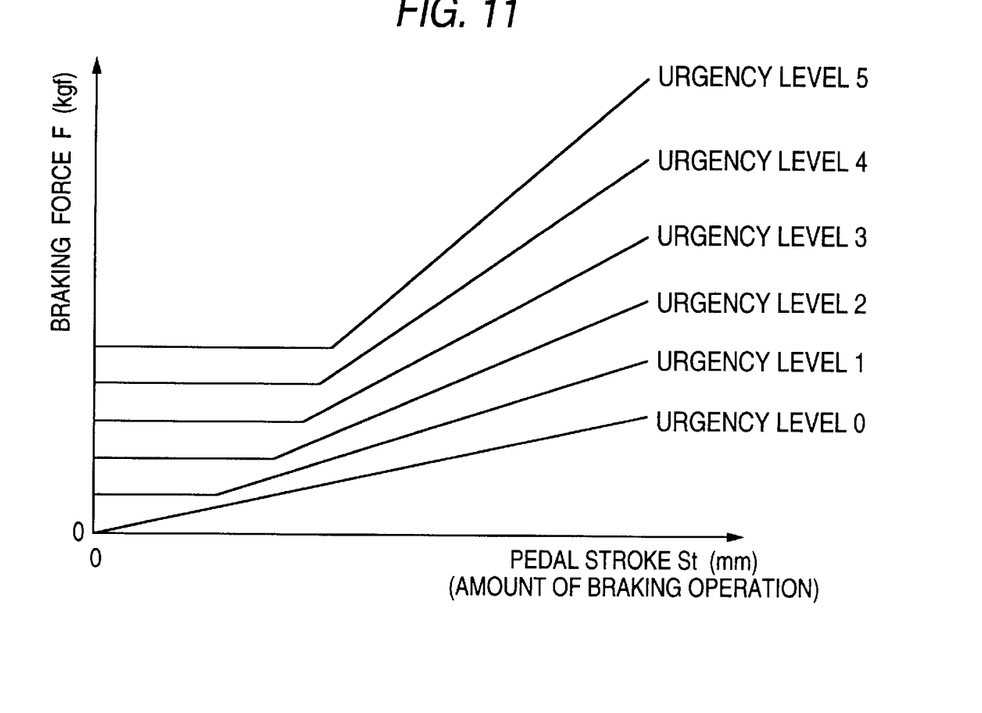
FIG. 11 is a graph showing relationships among braking force, pedal stroke length, and urgency levels, with the urgency levels being parameters.

In the third embodiment, relationships among braking force (kgf), pedal stroke length (=amount of braking operation, and see FIG. 6), and dangerous levels 0 to 5 are graphically depicted as shown in FIG. 11, with the dengerous levels being parameters. As seen from the graph, as the dangerous level becomes higher, a rate of increasing the braking force with respect to the pedal stroke becomes larger. In the third embodiment, the braking force used in the automatic brake control mode is equal to the braking force when the amount of the braking operation is zero (0) in the FIG. 11 graph.

The vehicle brake device of the present embodiment generates an alarm sound in the event of danger, and is placed to an automatic brake control mode from the start of alarming till the driver actuates the brakes. Visual presentation, in place of the sounding, may be used for alarming means.

As described above, the vehicle brake device of the third embodiment signals an alarm to the driver in the event of danger, and is placed to an automatic brake control mode from the start of alarming till the driver actuates the brakes. Therefore, the driver can perceive a dangerous situation before the automatic brake control mode starts, and can naturally accept the automatic braking operation. Further, it is noted that in the dangerous situation, the vehicle is decelerated through the automatic braking operation for a time period from an instant that the driver perceives the danger till the driver actually actuates the brakes, although the time period is very short. Because of the automatic braking operation, the vehicle can be brought to a safe stop even if the driver delays in starting the actual braking operation.

Also in the first embodiment, after the driver actually brakes the vehicle, the vehicle brake device stops the automatic brake control mode and carries out a brake assist control. The driver can perform a delicate vehicle-speed control that is required before the vehicle stops, but cannot be carried out by the automatic brake control, and can fully utilize the braking capability of the vehicle brake device.

Fourth Embodiment

Figure 12:
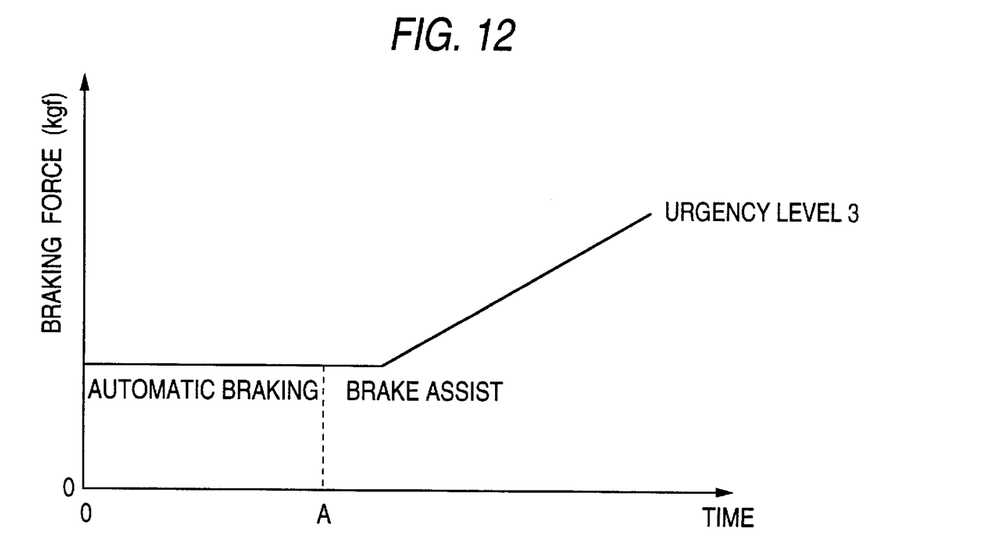
FIG. 12 is a graph useful in explaining a braking force control in the vehicle brake device of the fourth embodiment.

A fourth embodiment of the present invention which takes the form of a vehicle brake device will be described. A graph shown in FIG. 12 is useful in explaining a braking force control in the vehicle brake device of the fourth embodiment. As shown, an automatic brake control continues from a time point 0 to another time point A, and a brake assist control follows the automatic brake control. A braking force variation curve depicted in the graph represents that of a dangerous level 3.

A method of controlling a braking force in a dangerous situation of the vehicle is different from that in the third embodiment, while a circuit arrangement of the fourth embodiment is substantially the same as of the third embodiment.

The braking force controlling method of the vehicle brake device will be described.

As in the third embodiment, the vehicle brake device operates in an automatic brake control mode in a time range from an instant that the device recognizes the vehicle being in danger till the driver actually actuates the wheel brakes (viz., a range from time point 0 to time point A in FIG. 12). A braking force used in this mode is that at 0 of the amount of braking operation (FIG. 11).

Then, if the device determines that the driver actuates the brakes (at time point A in FIG. 12), the brake control mode of the device shifts from the automatic brake control mode to a brake assist control mode (FIG. 11). In this case, a braking force immediately after time point A, or a mode shifting point is selected to be equal to a braking force immediately before time point A.

After the brake control mode is shifted to the brake assist control mode from the automatic brake control mode, the vehicle is braked by a braking force equal to that used in the automatic brake control mode in the dangerous levels except the dangerous level 0 (FIG. 11). Therefore, the braking force is invariable or continuous when the automatic brake control mode is shifted to the brake assist control mode. The result is to eliminate an instability of the vehicle that is due to a variation or discontinuity of the braking force.

While the braking force is constant during the automatic brake control mode in the above-mentioned embodiments, it may be varied with time. In this case, it is necessary to select a braking force immediately after the time point A to be equal to a braking force immediately before time point A.

One dangerous level is used for determining the braking force used in the automatic brake control mode and the brake assist control mode in the above-mentioned embodiments. As an alternative, a dangerous level is periodically obtained by use of a dangerous state detecting circuit and a dangerous-level determining circuit, and the resultant dangerous level is used for determining the braking force or forces in the automatic brake control mode and the brake assist control mode. In this case, a plural number of braking forces each provided corresponding to a given dangerous level used in the brake assist control mode, are taken into consideration in connection with dangerous levels that are used in the automatic brake control mode. Further, the braking force immediately after the mode shifting point is selected to be equal to a braking force immediately before the mode shifting point.

In the present embodiment, the braking force immediately after the mode shifting point is equal to a braking force immediately before the mode shifting point. Therefore, the braking force is continuous at the mode shifting point where the automatic brake control mode is shifted to the brake assist control mode. This accrues to elimination of an instability of the vehicle, which results from a variation or discontinuity of the braking force.

The continuity of the braking force at the mode shifting point eliminates an unnatural drive feeling which otherwise would be inevitable where the braking force is discontinuous at the mode shifting point.

As seen from the foregoing description, a vehicle brake device constructed according to the present invention comprises: braking-operation detecting means for detecting an amount of the braking operation given by a driver; driver's condition detecting means for detecting driving conditions of the driver; emergency judging means for judging whether the vehicle is in emergency or not on the basis of the driving conditions detected by the driver's condition detecting means; and braking-force control means for control a braking force of the vehicle in accordance with the result of the judgement by the emergency judging means and the braking-operation amount detected by the braking-operation detecting means. With such an arrangement, even if the amount of the braking operation by the driver is below a predetermined one, the vehicle brake device recognizes that the vehicle is in emergency immediately after his braking operation. Therefore, the brake assist control is quickly started and hence a braking distance of the vehicle is reduced. Further, the determining as to if the vehicle is in emergency or not does not depend on the driving way difference among the drivers, eliminating the unnatural drive feeling and the erroneous operation of the vehicle brake device. Thus, the vehicle brake device provides the same determination as to if the vehicle is in emergency or not for the woman drivers who tends to depress the brake pedal not strongly and the drivers having the habit of strongly depressing the brake pedal.

The vehicle brake device further comprises surrounding-condition detecting means for detecting the surrounding conditions of the vehicle. In the device, the surrounding conditions detected by the surrounding-condition detecting means is also taken into consideration in the emergency judgement by the emergency judging means. Therefore, an urgency level is determined depending on not only the driving conditions of the driver but also an dangerous level in the surroundings of the vehicle. The determination of the urgency level is finer and exact, and the braking control is free from erroneous controls and does not give the unnatural drive feeling to the drivers.

The emergency judging means determines an urgency level on the basis of the driving conditions, and the braking-force control means controls a braking force of the vehicle in accordance with the urgency level determined. This technical feature provides finer urgency level determination, various brake controls, full utilization of the capacity of the vehicle brake device, and smooth brake control.

The emergency judging means determines an urgency level on the basis of a time that elapses from an instant that a driving condition is changed from an inattentive driving condition to a normal driving condition. Therefore, the urgency level can be determined by using a time elapsing from an instant that the driver perceives a collision danger till the vehicle brake device actually starts the brake control. The result is to provide an exact urgency level determination.

The emergency judging means determines an urgency level on the basis of a continuance in time of an inattentive driving condition of the driver. Therefore, an urgency level can be determined on the basis of an inattentiveness of the driver, providing an exact urgency level determination.

In the vehicle brake device, the emergency judging means judges that an urgency level is high, when the driver actuates the brakes immediately after a driving condition is changed from an inattentive driving condition to a normal driving condition. Thus, the urgency level determination does not depend on only the amount of the braking operation and the braking operation speed. The urgency level determination does not depend on the driving way difference among the drivers, eliminating the unnatural drive feeling and the erroneous operation of the vehicle brake device. More exactly, the vehicle brake device provides the same determination as to if the vehicle is in emergency or not for the woman drivers who tends to depress the brake pedal not strongly and the drivers having the habit of strongly depressing the brake pedal.

The inattentive driving condition is a sleepy or looking-aside driving condition. With this feature, the vehicle brake device can exactly detect an inattentive driving of the driver and determine an urgency level of the braking operation.

The braking-force control means increases more a braking force of the vehicle as an urgency level becomes higher. This feature produces a full utilization of the braking performances of the vehicle brake device, a smooth brake control, and a safe stop of the vehicle.

According to another aspect, there is provided a vehicle brake device comprising: surrounding-condition detecting means for detecting surrounding conditions of the vehicle; danger determining means for determining a dangerous level of possible vehicle collision on the basis of the surrounding conditions detected by the surrounding-condition detecting means; and braking force control means for continuing an automatic brake control mode till the driver starts to actuate the brakes. In the dangerous situation, the vehicle is decelerated through the automatic braking operation for a time period, although the time period is very short. Because of the automatic braking operation, the vehicle can be brought to a safe stop even if the driver delays in starting the actual braking operation.

The vehicle brake device further comprises alarming means for warning of possible vehicle collision against the driver in accordance with on a dangerous level, the braking force control means for continuing an automatic brake control mode from an instant that the alarming means starts to warn of possible vehicle collision till the driver starts to actuate the brakes. This feature enables the driver to perceive a collision danger before the automatic brake control mode starts, and does not feel an unnatural driving.

Further, the vehicle is decelerated through the automatic braking operation for a time period, although the time period is very short. Because of this, the vehicle can be brought to a safe stop even if the driver delays in starting the actual braking operation.

The vehicle brake device further comprises braking-operation detecting means for detecting an amount of the braking operation by the driver, and in the device, when a dangerous level indicates a danger of vehicle collision, the braking force control means performs an automatic brake control mode till the driver actuates the brakes, and when the driver actuates the brakes, the braking force control means controls the braking force in accordance with the dangerous level and the amount of braking operation.

The driver can perform a delicate vehicle-speed control that is required before the vehicle stops, but cannot be carried out by the automatic brake control, and can fully utilize the braking capability of the vehicle brake device.

When the braking force control means changes its braking force control mode from the automatic brake control mode to the control mode in which the braking force control means controls the braking force in accordance with the dangerous level and the amount of braking operation, the braking force control means controls the braking force so as to be continuous in variation at the mode shifting point. Therefore, the vehicle brake device can smoothly shift its control move from the automatic brake control mode to the brake assist control mode.

What is claimed is:

1. A vehicle brake device comprising:
    braking-operation detecting means for detecting an amount of braking by a driver;
    driver condition detecting means for detecting driving conditions of the driver;
    emergency judging means for judging whether the vehicle is in an emergency condition or not on the basis of the driving conditions detected by said driver condition detecting means; and
    braking-force control means for controlling a braking force of the vehicle in accordance with the result of the judgment by said emergency judging means and the braking-operation amount detected by said braking-operating detecting means.

2. The vehicle brake device as claimed in claim 1, further comprising surrounding-condition detecting means for detecting the surrounding conditions of the vehicle, and
    wherein the surrounding conditions detected by said surrounding-condition detecting means are also taken into consideration in the emergency condition judgment by said emergency judging means.

3. The vehicle brake device as claimed in claim 1, wherein said emergency judging means determines an urgency level on the basis of the driving conditions, and said braking-force control means controls said braking force of the vehicle in accordance with the urgency level so determined.

4. The vehicle brake device as claimed in claim 3, wherein said emergency judging means determines said urgency level on the basis of a time that elapses from an instant that a driving condition is changed from an inattentive driving condition to a normal driving condition.

5. The vehicle brake device as claimed in claim 3, wherein said emergency judging means determines said urgency level on the basis of a continuance in time of an inattentive driving condition of the driver.

6. The vehicle brake device as claimed in claim 3, wherein said emergency judging means judges that said urgency level is high, when the driver actuates the brakes immediately after a driving condition is changed from an inattentive driving condition to a normal driving condition.

7. The vehicle brake device as claimed in claim 4, in which said inattentive driving condition is a sleepy or looking-aside driving condition.

8. The vehicle brake device as claimed in claim 3, wherein said braking-force control means increases said braking force as said urgency level becomes higher.

9. A vehicle brake device comprising:

surrounding-condition detecting means for detecting surrounding conditions of the vehicle;

danger determining means for determining a danger level of possible vehicle collision on the basis of the surrounding conditions detected by said surrounding-condition detecting means;

braking force control means for initiating and continuing an automatic brake control mode until the driver starts to actuate the brakes;

alarm means for warning of possible vehicle collision in accordance with said level, said braking force control means continuing said automatic brake control mode from an instant that said alarm means starts to warn of possible vehicle collision until the driver starts to actuate the brakes; and, braking-operation detecting means for detecting an amount of braking operation by the driver, in which when said level indicates a danger of vehicle collision, said braking force control means performs said automatic brake control mode until the driver actuates the brakes, and when the driver actuates the brakes, said brake force control means controls the braking force in accordance with the danger level and the amount of braking operation.

10. The vehicle brake device as claimed in claim 9, wherein when said braking force control means changes its braking force control mode from said automatic brake control mode to the control mode in which said braking force control means controls the braking force in accordance with the danger level and the amount of braking operation, said braking force control means controls the braking force so as vary continuously through the mode shifting point.

* * * * *